(12) United States Patent
Capuozzo et al.

(10) Patent No.: US 8,271,039 B2
(45) Date of Patent: Sep. 18, 2012

(54) TRIGGER MEDIATION SYSTEM

(75) Inventors: Giuseppe Capuozzo, Rome (IT);
Fortunato Pasqualone, Rome (IT);
Marco Ridolfi, Rome (IT)

(73) Assignee: Accenture Global Services Limited, Dublin (IE)

( * ) Notice: Subject to any disclaimer, the term of this patent is extended or adjusted under 35 U.S.C. 154(b) by 748 days.

(21) Appl. No.: 12/234,785

(22) Filed: Sep. 22, 2008

(65) Prior Publication Data
US 2010/0027774 A1 Feb. 4, 2010

(30) Foreign Application Priority Data

Jul. 31, 2008 (EP) .................................... 08425533

(51) Int. Cl.
*H04B 1/38* (2006.01)

(52) U.S. Cl. ................. 455/560; 455/412.1; 455/412.2; 455/414.1; 455/432.1; 455/433; 370/395.2; 379/201.02

(58) Field of Classification Search ............... 455/412.1, 455/412.2, 414.1, 432.1, 433, 560; 370/395.2; 379/201.02
See application file for complete search history.

(56) References Cited

U.S. PATENT DOCUMENTS

| | | | |
|---|---|---|---|
| 6,085,105 A * | 7/2000 | Becher ........................... | 455/517 |
| 6,507,589 B1 * | 1/2003 | Ramasubramani et al. .. | 370/465 |
| 2005/0047423 A1 | 3/2005 | Kaul et al. | |
| 2007/0041528 A1 | 2/2007 | Menon et al. | |
| 2008/0146201 A1 * | 6/2008 | O'Neill et al. ............. | 455/414.1 |
| 2009/0217299 A1 * | 8/2009 | Belluati et al. ................ | 719/318 |
| 2009/0323636 A1 * | 12/2009 | Dillon et al. .................. | 370/331 |

FOREIGN PATENT DOCUMENTS

| | | |
|---|---|---|
| WO | WO 98/46030 | 10/1998 |
| WO | WO 98/46030 A2 | 10/1998 |
| WO | WO 03/056867 A2 | 7/2003 |
| WO | WO 03/056867 A3 | 7/2003 |

OTHER PUBLICATIONS

European Search Report for related European Patent Application No. EP 08 42 5533 issued Jan. 7, 2009.
European Search Report dated Jan. 7, 2009 issued in related EP Patent Application No. EP 08 42 5533.
Non-Final Office Action dated May 26, 2009, issued in related U.S. Appl. No. 11/975,260.
Final Office Action dated Dec. 22, 2009, issued in related U.S. Appl. No. 11/975,260.

* cited by examiner

*Primary Examiner* — Amancio Gonzalez
(74) *Attorney, Agent, or Firm* — Brinks Hofer Gilson & Lione

(57) ABSTRACT

A system for processing a call from a subscriber in a telecommunication network includes a service-oriented architecture-based orchestrator configured to communicate with legacy communication platforms and next-generation communication platforms, and to an application layer or intelligent network (IN) portion of the telecommunication network. The orchestrator is configured to receive a multi-part service request corresponding to the call from the subscriber, where the multi-part service request includes multiple individual service requests. A service database is configured to provide an identity and network location of multiple control points (service control points, telco control points), where each control point corresponds to an individual service request. Protocol adapters provide a communication interface with each control point, and with the core network. A network service orchestrator simultaneously communicates with each control point and requests processing instructions corresponding to the individual service request. Processing instructions corresponding to the respective individual service request received from each control point facilitate processing the call and implementing the services requested.

7 Claims, 8 Drawing Sheets

TRIGGER MEDIATION SYSTEM

CROSS-REFERENCE TO RELATED APPLICATIONS

This application claims the benefit of priority from European Patent Application No. 08 425 533.0, filed on Jul. 31, 2008, entitled Trigger Mediation System, and is hereby incorporated by reference in its entirety.

BACKGROUND OF THE INVENTION

1. Technical Field

This disclosure relates to telecommunication systems and intelligent network (IN) architecture. In particular, this disclosure relates to a trigger mediation system for performing advanced services requested by a subscriber through the use of multiple service control points (SCPs), regardless of subscriber's access network.

2. Background

Subscribers or end-users connected to the telephone network may request a particular service during a call. A "service" is a value-added feature, such as call-diversion, free 800-number services, voice mailbox, or other feature. The subscriber may also request a set of services, which includes two or more services corresponding to one subscriber call. The phrase "multi-part" service may be used interchangeably with the phrase "set of services," and means that more than one service is addressed to fulfill the request. Processing a set of services requires sequential operation to fulfill all services. For example, in existing wireless communication networks, a mobile switching center (MSC) may separately and independently contact a first service control point (SCP) to handle the first service request, then separately and independently contact the second SCP to handle the second service request. This is a fairly complex procedure and represents an inefficient use of the network bandwidth. Such multiple sequential SCP access introduces significant real-time processing delays, which may result in customer service completion delays.

Further, some services may not be available to the subscriber because the telephone company ("Telco") has not made arrangements with a service supplier to provide such services. In addition, a small number of service suppliers traditionally control the marketplace for such value-added services. Accordingly, the Telco may hire the service provider to bundle multiple services on one SCP so that multiple popular services may be made available to the subscriber. However, this is expensive because the suppliers control the market and extract a high price for implementing the services. Bundling services also requires time to implement and deploy the services even though the multiple services may exist independently on different SCPs in the network. Additionally, extensive software debugging is required, which increases expense and may delay product roll-out.

To provide a set of services, two options may be available in existing Public Land Mobile Network (PLMN) Circuit-Switched (CS) networks (GSM). As a first option, the MSC may separately and independently contact a first SCP to handle the first service request, then separately and independently contact a second SCP to handle the second service request.

As a second option, the telephone company (Telco) may hire the service provider to bundle both services on one SCP. In other words, the supplier may be hired to create the second service (e.g., Originating Identification Restriction Service), which currently resides on the second SCP, and place the newly created service on the first SCP so that the first SCP contains both services. Thus, the first SCP would then contain the bundled features of the 800-number service and the Originating Identification Restriction service. However, this is expensive and requires time to implement, even though both services may exist independently.

In the above example in a PLMN CS network (GSM), when the end-user requests the 800-number service, the MSC receives a trigger, which initiates processing. To perform the operation requested by the calling user, the MSC contacts the first SCP by establishing a communication link with the first SCP using the appropriate protocol. Once connected, the MSC facilitates operation of the 800-number service. After the 800-number service has been provided, the MSC disconnects from the first SCP.

To facilitate the second part or Originating Identification Restriction service of the calling user request (transparently as viewed by the end-user), the MSC then contacts the second SCP based on a second trigger or event, and establishes a new communication link with the second SCP using the appropriate protocol. Once connected, the MSC facilitates operation of the Originating Identification Restriction service. After the Originating Identification Restriction feature has been provided, the MSC disconnects from the second SCP, and the end-user request is complete. Note, however, that the type of communication link and the "appropriate" protocol used between the MSC and the first SCP and second SCP may differ.

SUMMARY

A trigger mediation system for processing a call from a subscriber in a telecommunication network includes a service-oriented architecture-based orchestrator configured to interface to legacy and next-generation communication platforms and to an application layer or intelligent network (IN) portion of the telecommunication network. The orchestrator is configured to receive a request of a set of services corresponding to the call from the subscriber, where the request of a set of services includes multiple individual service requests (e.g., a multi-part request or service request). A service database is configured to provide an identity and network location of multiple control points (service control points, telco control points) where each control point is able to meet an individual service request. The trigger mediation system is able to interconnect with different kinds of control points and several types of core networks, due to the use of various protocol adapters. A network service orchestrator simultaneously communicates with each control point and requests processing instructions corresponding to the individual service request. The network service orchestrator then receives from each respective control point, processing instructions corresponding to the respective individual service request, and processes the call according to the processing instructions received.

A method for processing a call from a subscriber in a telecommunication network includes receiving a request for a set of services corresponding to the call from the subscriber, identifying multiple individual service requests contained in the request, and identifying a core network to which the subscriber is coupled. A service database is inspected to determine an identity and network location of multiple control points (service control points, telco control points), where each control point corresponds to an individual service request. Based upon the type of request from the subscriber, a first protocol adapter, which handles non-messaging-type protocols, is selected from a plurality of protocol adapters to provide a communication interface with the core network based on the identity of the core network, or a second protocol adapter, which handles messaging-type protocols, is selected from the plurality of protocol adapters to provide a communication interface with the core network based on the identity of the core network. Simultaneous communication with each control point is performed to request processing instructions corresponding to the individual service request. Processing instructions are then received from each control point corresponding to the respective individual service request, and the call is processed according to the processing instructions received.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
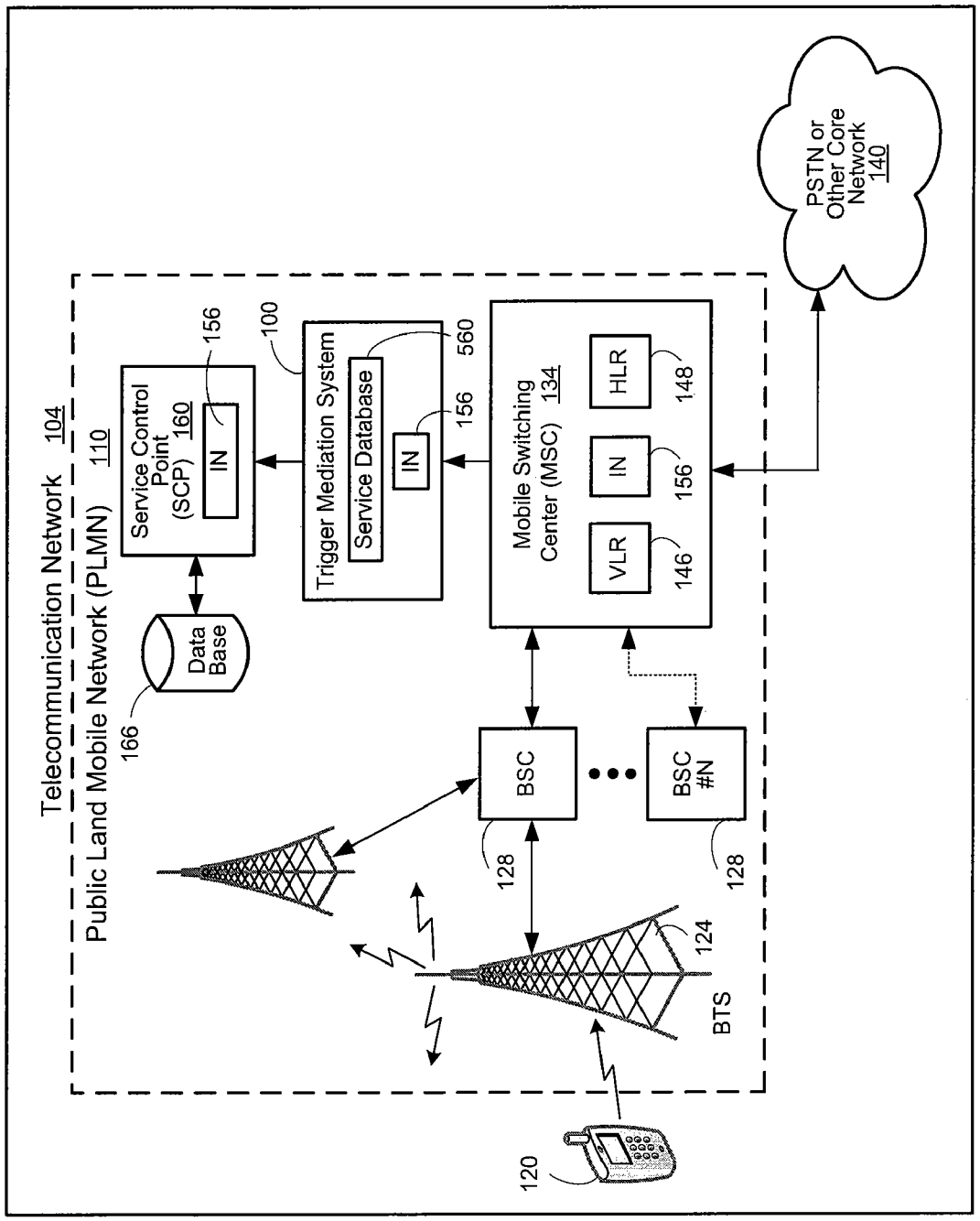
FIG. 1 shows the trigger mediation system in a wireless telecommunication network.

FIG. 1 shows a trigger mediation system 100 in telecommunication network 104. The environment in which the trigger mediation system 100 is shown may be referred to as a Circuit-Switched PLMN (CS-PLMN) environment. The telecommunication network 104 may include a mobile network, such as a Public Land Mobile Network 110 (PLMN), which may be arranged as a CS-PLMN or a Packet-Switched PLMN (PS-PLMN). The PLMN 110 may include a mobile subscriber 120, also referred to as a mobile station, wireless telephone, cellular telephone, handset, mobile handset, personal digital assistant, or other communications device, which may send and receive signals to and from a Base Transceiver Station 124 (BTS). The BTS 124 includes all of the necessary radio-frequency components, such as the transceiver, antenna, amplifiers, and other components, and includes a link to a Base Station Controller 128 (BSC). The BSC 128 may control one or more BTSs 124, and controls and directs the mobility of the mobile handset 120. One or more BSCs 128 may be coupled to a Mobile Switching Center 134 (MSC). In a land-based network, a land-line or fixed telephone device may also be designated with reference numeral 120.

The MSC 134 is the central component of the CS-PLMN 110. The MSC 134 handles call set-up and termination, routes traffic to the desired destination, and provides billing detail information. The MSC 134 is an automatic system which may be part of the interface for user traffic between the PLMN 110 and other public switched networks, such as a Public Switch Telephone Network 140 (PSTN), or other MSC in the same or other wireless networks. The MSC 134 registers unknown mobile handsets that are visiting (roaming) the network, and stores the information in a Visitor Location Register 146 (VLR). The VLR 146 is co-located with each MSC 134, and contains information about the present location of each of the visiting mobile subscribers and the current status of the corresponding mobile handset (power on/off, active/idle mode).

The MSC 134 also provides necessary information to a "home" network in a Home Location Register 148 (HLR). The HLR 148 stores primary information about permanently assigned "home" users and their corresponding mobile handsets. Each mobile handset 120 is assigned to one HLR 148. The HLR 148 may store information, such as, the types of services the mobile subscriber uses (voice, data, prepaid), the present location of the customer as derived from other "foreign" mobile switching centers, and the international mobile subscriber identification (IMSI) number assignment, which is unique to each handset 120.

Modern switching networks, such as the PLMN 110 and PSTN 140 are based on an Intelligent Network (IN) architecture 156, where the traffic portion of the network is separated from the signaling portion of the network. Intelligent Network (IN) architecture 156 is also referred to as WIN (Wireless Intelligent Network Architecture) in the wireless or mobile environment. The term "intelligent network" is used interchangeably with the term "intelligent network platform" or "intelligent network architecture." Based on the IN architecture 156, "intelligence" is separated from network switches and placed in distributed computer nodes to support provision, control and management of multiple telephone services.

The trigger mediation system 100 enables the IN architecture 156 to support multiple different services independent of the underlying network technologies, and defines a service-oriented functional architecture that permits the provision of generic service components that can be combined to construct new telecommunication services. Because of the trigger mediation system 100, the IN architecture 156 functions as a telecommunications network service control architecture that provides a generic platform for open, distributed, service-independent communication. Such an open platform architecture supports the uniform creation, control and management of advanced services beyond the basic telephone services. The IN architecture 156 has been implemented using a variety of protocols over the industry-standard SS7 telephone signaling network. For the signaling part of the network, the SS7 protocol standard is used. National versions of the SS7 protocol have been implemented by various countries. The SS7 protocol is similar to TCP/IP protocol and implements much of the OSI (Open Systems Interconnection Reference Model) seven-layer model.

The PLMN 110 with its corresponding MSC 134 may be operatively coupled to the PSTN 140 (or other core network) and to the trigger mediation system 100. The trigger mediation system 100 may be in the form of a layer or application coupled between the core communication network 140 and the IN platform 156 in a wireless or a wireline communication environment.

The MSC is coupled to the trigger mediation system 100, which may be in turn, coupled to one or more Service Control Points 160 (SCP). The SCP 160 is part of the IN architecture 156 and is a real-time transaction processing system having one or more databases 166, and which provides service control and service data functions. The MSC 134 issues a message or query to the trigger mediation system 100, the trigger mediation analyzes the query and it contacts the SCP. The SCP is able to meet the request, and performs subscriber or application specific service logic in response to the query. The SCP 160 then sends back instructions to the trigger mediation system 100 to perform the specified functions.

The MSC 134 may detect "events" during call processing, which indicate an IN call event. After the MSC 134 detects the event, it suspends call processing and begins a single transaction with the trigger mediation system 100. The trigger mediation system 100 then begins a series of transactions with the SCP 160 to determine special requirements or processes associated with the handling of the call, which is referred to as a "trigger." For example, the SCP 160 may provide special non-standard features or services, such as number translation (free 800 numbers), conference calling, call forwarding, caller ID blocking (*67), last number redial (*69), voice mailbox, and other value-added services.

Figure 2:
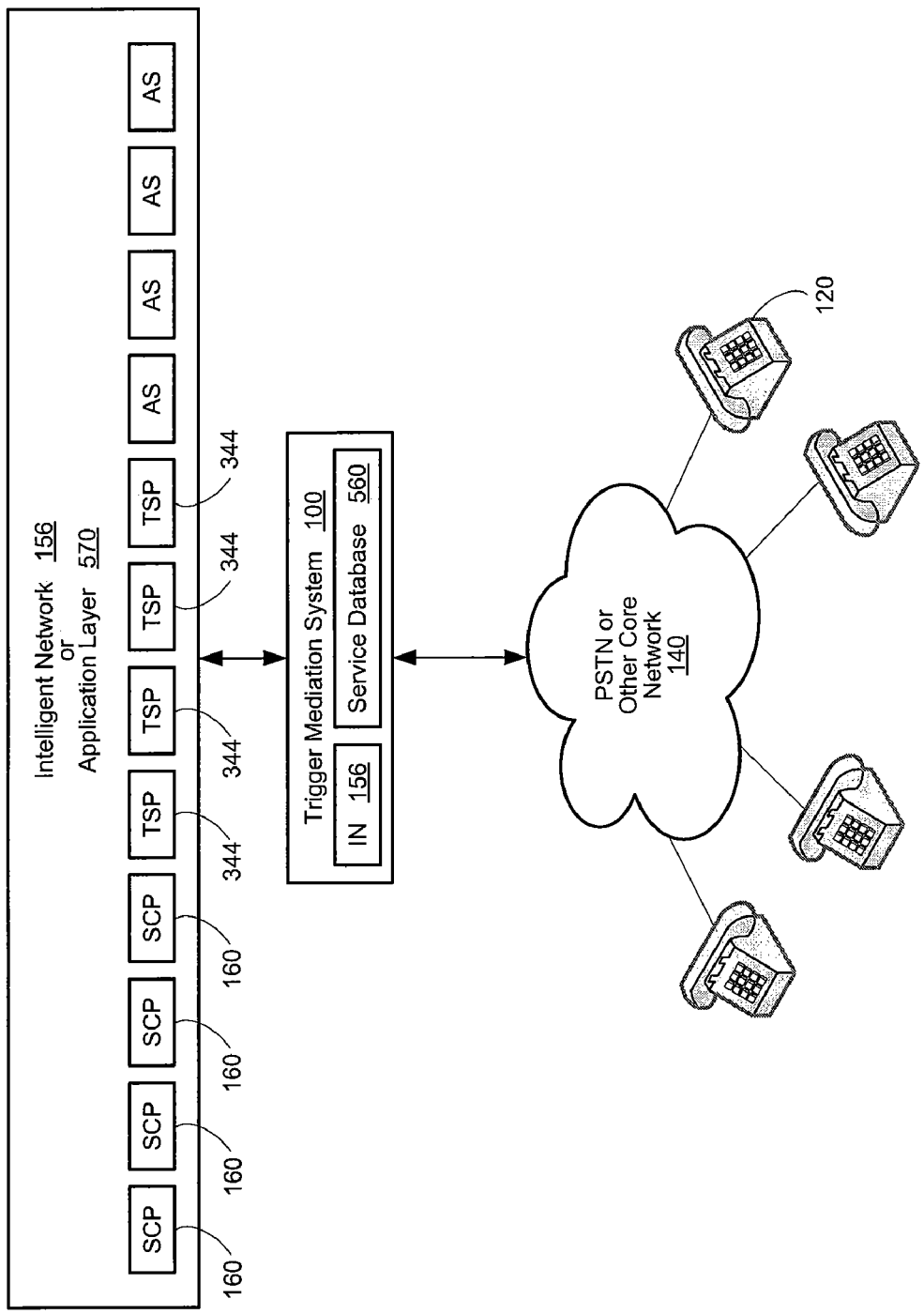
FIG. 2 shows the trigger mediation system in a land-based telecommunication network.

FIG. 2 shows a trigger mediation system 100 in the land-based portion of the telecommunication network. The PSTN 140 components on the fixed switching side of the telecommunication network may also be coupled using the IN architecture 156. In the land-based communication network, such as the PSTN 140 for example, Service Switching Points (SSP), or nodes detect the "events" or trigger during call processing, which indicates an IN call event. When the SSP detects the trigger, it suspends call processing and starts a transaction with the trigger mediation system 100, which in turn, contacts the SCP 160 to determine special requirements or processes associated with the handling of the call. Similarly, in the mobile communication network, the MSC 134 includes it own internal SSP.

Figure 3:
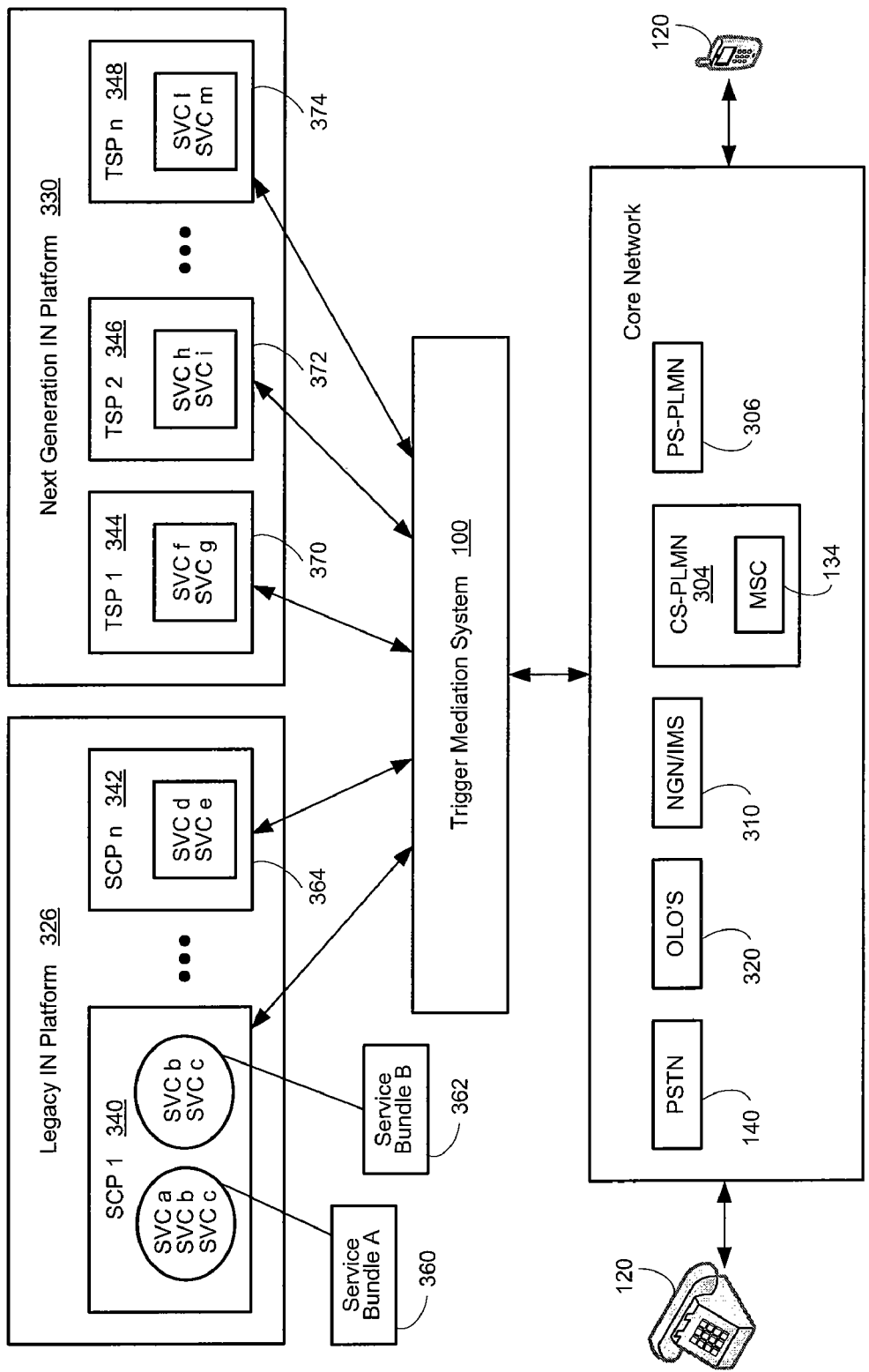
FIG. 3 shows a service representation in an intelligent network.

FIG. 3 shows the trigger mediation 100 linked with other core networks, and such core networks may include, for example, the PSTN 140, next-generation network/3GPP IP multimedia subsystem 310 (NGN/IMS), and other licensed operator networks 320 (OLOs). The trigger mediation system 100 is also coupled to a legacy IN platform 326 and a next-generation IN platform 330. The legacy IN platform 326 may include, for example, an historically early intelligent network platform developed by the service suppliers, which may be based on silo-type architecture. The next generation platform 330 may provide innovative broadband services leveraging IP technology, high bandwidth availability and multi-service layered architecture, to permit the transport of all information and services, such as voice, data, and media, such as video.

The trigger mediation system 100 communicates with multiple SCPs, such as a first SCP 340 and a second SCP 342 in the legacy IN platform 326, and also communicates with multiple Telco Service Points (TSPs), such as TSPs 344, 346, and 348. The TSPs may be similar to the SCPs in basic function, but may provide advanced services.

In FIG. 3, the legacy IN platform 326 includes the first SCP 340 and the second SCP 342. The first SCP 340 may include combinations of various services, such as service a, service b, and service c. The services may be grouped into different service bundles. For example, a service bundle "A" 360 may include service "a," service "b," and service "c," while service bundle "B" 362 may only include service "b" and service "c." The second SCP 342 may include service "d" and service "e" 364 in unbundled form. The IN legacy platform 326 may include any number of SCPs.

Similarly, the next-generation IN platform 330 includes the first TSP 344, the second TSP 346, and the third TSP 348. The next-generation IN platform 330 may include any number of TSPs. The three TSPs may provide various services, such as service "f," service "g," service "h," service "i," service "l", and service "m" (370, 372, 374).

The services labeled as "f" through "m" may be offered as stand-alone services or as groups of bundled services. A bundled service is a service that may employ the simultaneous or sequential operation of two separate services. Services "f" through "m" are examples of unbundled services. For example, the subscriber or end-user 120 may wish to use the features of a first service, for example, a free "800-number" service, in conjunction with a second service, for example, a Originating Identification Restriction Service to hide a number from the called user. Thus, the subscriber's request is a two-part request that includes multiple individual service requests. The procedure implemented to process the subscriber's request is preferably transparent to the end-user. In this example, the first TSP 344 (or first SCP 340) may provide the 800-number service, while the second TSP 346 (or second SCP 342) may provide the Originating Identification Restriction Service.

The trigger mediation system 100 provides the orchestration to handle the multiple requests, thus increasing the efficiency of the MSC 134. Accordingly, separate and independent communication sessions with the corresponding SCP or TSP is eliminated. The advantages of the trigger mediation system 100 are further highlighted as an end-user request requires the combination of additional SCP-provided features. The trigger mediation system 100 reduces system processing delays by eliminating multiple SCP or TSP requests, which may increase overall customer satisfaction with the services provided.

Figure 4:
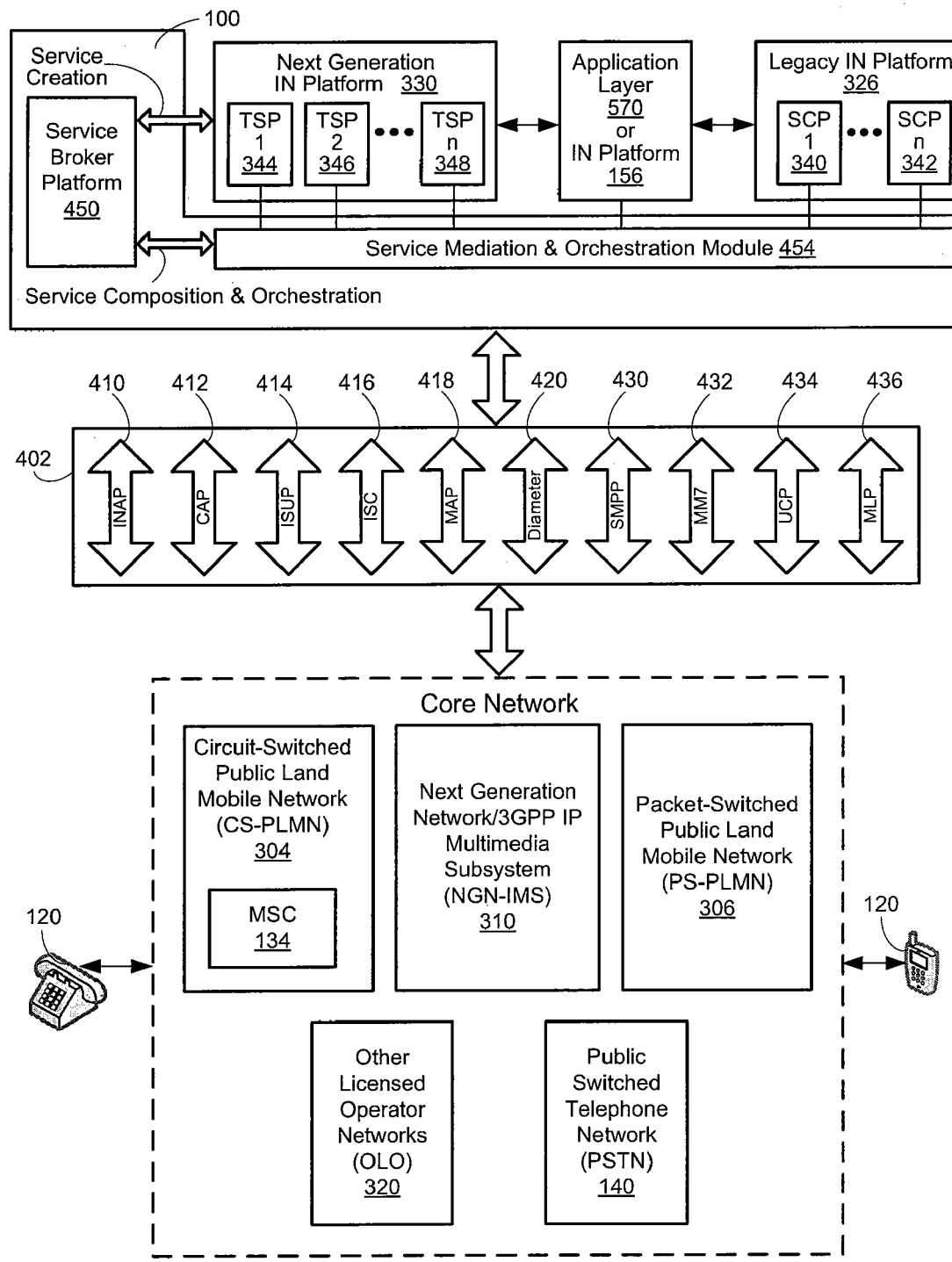
FIG. 4 is a block diagram showing the trigger mediation system in a network environment.

FIG. 4 is a block diagram of the trigger mediation system 100. The trigger mediation system 100 may be implemented as a distributed component and may be operatively coupled to the mobile communication network 110 (PLMN). The trigger mediation system 100 may also be coupled to the fixed land-based communication network. The trigger mediation system 100 is a layer between the core network and the IN platform 156, which is triggered by the control network node, such as the MSC 134 (or the SSP in a land-based network).

The trigger mediation system 100 includes a universal interface provision 402 having multiple adapters or "plug-ins," and is able to communicate with any selected core networks, such as the PSTN 140, PLMN 110 (CS-PLMN 304, PS-PLMN 306), NGN/IMS 310, and OLOs 320 through the MSC 134. When communicating with the core networks, the trigger mediation system 100 handles a variety of non-message based protocols, including INAP 410 (Intelligent Network Application Protocol, ETSI core INAP (CSI) according to ETS 300 374-1), CAP 412 (Camel Application Part [Customized Applications for Mobile Network Enhances Logic], phases 1-3), ISUP 414 (ISDN User Part), ISC 416 (Internet Systems Consortium-according to RFC 3261, 3GPP 24.228, 3GPP 24.229), MAP 418 (Mobile Application Part-according to 3GPP TS 29.002), DIAMETER 420, and other communication protocols. Further, the universal interface 402 handles a variety of message-based protocols, such as SMPP 430 (Short Message Peer-to-Peer—according to SMS Forum, XCAP according to RFC 4825), MM7 432 (Multi-Media Message-7), UCP 434 (Universal Communication Platform), MLP 436 (Mobile Location Protocol), and other message-based protocols. Messaging-Based protocol is characterized by the kind of service. For example, Short Message Service (SMS) is based on messaging-based protocol.

The trigger mediation system may include a service creation environment 450 (also referred to as the service broker platform) and a service mediation and orchestration module 454 or environment. The service creation environment 450 is responsible for the initial set-up, creation, and implementation of the service arrangement or bundles, and may typically be used by Telco personnel to design, develop, enhance, and deploy various services in response to perceived or actual demand for such services or service combinations.

The service mediation and orchestration module 454 automatically orchestrates and processes in real-time the service or service bundles requested by the subscriber, which have been previously implemented using the service creation environment 450. The service mediation and orchestration module 454 processes the subscriber's request for service features.

The service creation environment 450 and the service mediation and orchestration module 454 may be coupled to the SCPs 340 and 342 in the legacy IN platform 326. The legacy IN platform 326 may be a TDM (time division multiplex) legacy IN platform having control points in the form of SCPs. The service creation environment 450 and the service mediation and orchestration module 454 may also be coupled to the TSPs 344, 346, 348 (Telco Service Points) in the next-generation IN platform 330 and to the SCPs 340 and 342 in the legacy IN platform 326. The trigger mediation system 100 may orchestrate IN services developed on the next-generation TSPs 344, 346, 348 (and the SCPs 340 and 342) to create and deliver new and more complex services and/or combinations of services.

Figure 5:
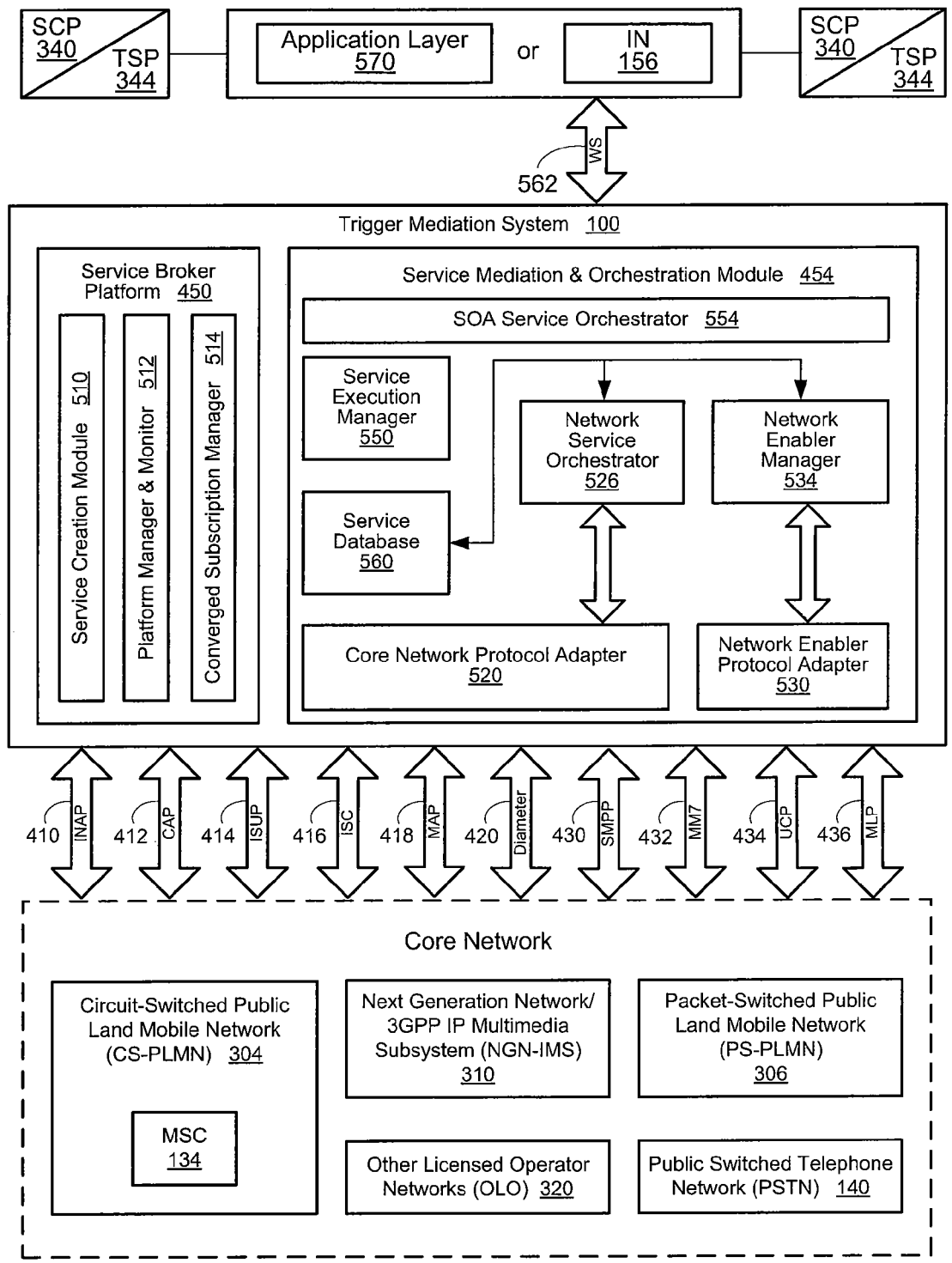
FIG. 5 is a block diagram of the trigger mediation system.

FIG. 5 shows the trigger mediation system 100 in greater detail. The service broker platform 450 may include a service creation module 510, a platform management and monitoring component 512, and a converged subscription manager 514. The service mediation and orchestration module 454 may include a core network protocol adapter 520 (which may include multiple protocol-specific adapters), a corresponding network service orchestrator 526, a network protocol adaptor 530 (which also may include multiple protocol-specific adapters), and a corresponding network enabler manager 534. Also included is a service execution environment 550 and an SOA (service-oriented architecture) service orchestrator 554.

In operation, for example, a subscriber or end-user may submit a request using a mobile device in communication with the MSC 134. This may cause a trigger event, which indicates the request of one or more specific services. The trigger mediation system 100 then receives the trigger event from the PLMN 110. However, because with the trigger mediation system 100 is in place, the MSC 134 does not initiate contact with the corresponding SCPs and/or TSPs. Rather, the trigger mediation system 100 handles all such communication with the multiple SCPs and/or TSPs.

If the subscriber requests a type of service, which is based on non-messaging type of protocol, the core network protocol adapter 520 inspects the request. The core network protocol adaptor 520 includes multiple specific network adapters that allow connectivity and interactions with various service platforms (including SIP/IMS, IN SCP, and legacy mobile and fixed networks). The core network protocol adapter 520 determines which core network it is coupled to, for example, the PLMN 110 (CS-PLMN 304 or PS-PLMN 306), PSTN 140, NGN/IMS 310, or OLOs 320, and thus functions as a universal interface to the core networks. Next, the core network protocol adapter 520 determines the type of protocol (non-messaging type protocol, for example) carrying the service request (e.g., INAP 410, CAP 412, ISUP 414, ISC 416, MAP 418, DIAMETER 420, or other communication protocol) and sets a non-messaging protocol indicator so that corresponding communication and messages are arranged in the appropriate non-messaging protocol format.

The network service orchestrator 526 interfaces with the core network protocol adapter 520 to handle and process non-message-type requests, and manages execution of the requested service or service bundle. For example, the network service orchestrator 526 may recognize that the subscriber has requested two services (although this is transparent to the user), such as the 800-number service and the Originating Identification Restriction service, described in an earlier example. The network service orchestrator 526 may interrogate a service database 560 or other storage device to determine which specific SCP or TSP provides the 800-number service and which specific SCP or TSP provides the Originating Identification Restriction service. Based on the information obtained from the service database 560, the network service orchestrator 526 connects to the identified SCP and/or TSP through the SOA service orchestrator 554. An SCP is typically identified by a "point code," while a TSP is identified by an IP address or point code. The interface to the SOA service orchestrator 554 may include a web services-type interface 562 using protocols established by SOA methodologies and standards.

Communication with the multiple control points (SCPs, 340-348 and/or TSPs, 344, 356, 348) may occur substantially or effectively simultaneously rather than in a sequential manner, as is required with existing communication networks. That is, the network service orchestrator 526 communicates with multiple SCPs and TSPs (via the SOA service orchestrator 554) during the same session without the need to disconnect from one SCP (or TSP) and connect with another SCP (or TSP). The network service orchestrator 526 passes the service request to the appropriate SCP (or TSP), and in response, the SCP (or TSP) returns information or processing instructions regarding how to process the service request. Such information returned back from the SCP, for example, may include the destination number of the call center operator, with reference to 800-number service. Based on the information returned by the corresponding SCP, the trigger mediation system 100 processes the subscriber's call and corresponding request, and thus executes the requested services. For example, the SCP may recognize the calling user and service requested via the information stored in its database, and may implement service logic based on such information.

The service request from the subscriber, which may represent multiple separate service requests, is received by the trigger mediation system 100 and represents a single trigger event. Accordingly, the multiple SCPs or TSPs are simultaneously contacted based on a single trigger or trigger event. In existing networks without the trigger mediation system 100, the MSC 134 or other node would sequentially contact each SCP, requiring a connect, disconnect, and connect again process, to obtain the required information or processing instructions, which is a very inefficient use of network bandwidth and processing capacity.

The network service orchestrator 526 extends the capabilities offered by standard 3GPP SCIM (Service Capability Integration Management) by providing service interaction and mediation solutions across multiple domains covering a variety of networks, including for example, SS7 based networks, SIP/IMS networks (protocol for the NGN/IMS core network) and other networks. The network service orchestrator 526 controls and directs service delivery from multiple application platforms, and manages session and call information. The network service orchestrator 526 supports standard 3GPP IMS filter criteria processing, IMS policy management, and on-line/off-line IMS charging functions. The network service orchestrator 526 operation extends to IMS, pre-IMS (IN, SS7 networks) and other non-IMS domains, including IT/SOA domain.

The SOA service orchestrator 554 leverages the Service Oriented Architecture (SOA) framework to build complex service functions in a hierarchy. It uses a workflow modeling and execution engine to implement the service logic. This provides a flexible "service building block" model, and may function in conjunction with an application layer 570 based on an enterprise service bus (ESB). The SOA framework enables advanced services, such as the instant messaging service through a television device. The application layer 570 interfaces with the legacy IN platform 326 and the next-generation IN platform 330. In such a configuration, the web-services communication interface 562 may be used for communication between the SOA service orchestrator 554 and the application layer 570. In another embodiment, the SOA service orchestrator 554 may interface with a component of the intelligent network (IN) platform 156 using a non-web services interface, such as INAP or other protocol associated with the IN.

Like the core network protocol adapter 520, the network enabler protocol adapter 530 also determines which core network it is coupled to, for example, the PLMN 110 (CS-PLMN 304 or PS-PLMN 306), PSTN 140, NGN/IMS 310, or OLOs 320, and thus also functions as a universal interface to the core networks. The network enabler protocol adapter 530 determines the type of messaging protocol carrying the service request, such as SMS Gateway, MMS Gateway, Messaging Platform, WAP Gateway, SMPP, MM7, UPC, MPL, or other messaging-type protocols, and sets a messaging protocol indicator so that corresponding communication and messages are arranged in the correct messaging protocol format. The network enabler protocol adaptor 530 may include multiple network "plug-in" components configured to translate network messages into the proper format suitable for processing by the network enabler manager 534. Once a network or application-initiated request is authorized for network access, the network enabler protocol adaptor 534 translates the request into the format necessary for a given network node. The network enabler protocol adaptor 534 operates in a similar manner to the core network protocol adaptor 520 but handles messaging-type protocol, whereas the core network protocol adaptor 520 handles non-messaging-type protocol.

The network enabler manager 534 interfaces with the network enabler protocol adapter 530 to handle and process messaging-type requests, and manages execution of the requested service or service bundle. The network enabler manager 534 is similar to the network service orchestrator 526 with respect to function, but interfaces with the network enabler protocol adapter 530 to handle messaging-type protocol. Like the network service orchestrator 526, the network enabler manager 534 also interfaces with the SOA service orchestrator 554 to perform its function of connecting to the required SCPs and/or TSPs. Similarly, multiple SCPs and/or TSPs are simultaneously handled, all stemming from a single trigger.

The above-described components included in the service mediation and orchestration module 454, such as the core network protocol adapter 520, the network enabler protocol adapter 530, the network service orchestrator 526, the network enabler manager 534, the service execution manager 550, and the SOA service orchestrator 554, generally involve processing a request for service, where the trigger mediation system 100 has been previously used to design, develop, create, and implement the various value-added services or service bundles.

On the other hand, the service creation environment 450 represents the high-level component used by the Telco personnel to perform such design, development, creation, and implementation of service(s) or service bundle(s). A service bundle may be created with multiple parts (e.g., individual services), for example, comprising service A, B, C, and D, and the processing engine for performing the actual processing for services A-D may be located on one or more SCPs or TSPs coupled to the PLMN 110 or other core networks. A developer using the service creation module 510 first determines the nature of the service bundle or what services are included in the bundle. The service creation module 510 is then used to determine the location and identification of the various SCPs and/or TSPs that process the services included in the service bundle. Such information is then stored in the service database 560.

The service creation module 510 provides various tools for software developers to create new services, which may be a combination or bundle of existing services, and to extend existing services. Using the service creation module 510, the developer may reduce the time-to-market for new services and service bundles. The service creation module 510 may include a set of libraries, SDK (software development kit) and configuration tools to permit simple and rapid service and service bundle development. This service creation module 510 may define the standards and interfaces/common functionalities that an application developer should apply. The service creation module 510 may be used to develop enabling services, such as a location-based service, where a service is modified depending upon target geography, and to create composite services. The service creation module 510 software may be implemented using a suitable high-level language, object-oriented or graphics-based language operating on a commercially-available computing platform having an industry-standard operating system.

A new combination or bundle of existing services, may be created using the service creation module 510 tool kit and software development in a graphical format. The developer may combine existing services using a graphical interface, which may display the location and identity of the SCP/TSP containing the processing engine for the individual service. Graphical links may establish an interconnection or logical relationship between the services on the same or separate SCPs/TSPs, and protocol information and communications pathway data may be automatically established and saved in the service database 560. Thus, the service database 560 will contain all of the necessary information to enable the network service orchestrator 526 or the network enabler manager 534 to arrange for the service request from a subscriber to be processed and satisfied.

During development of the services using the service creation module 510, the service execution manager 550 manages the environment or infrastructure necessary to support the development. The service execution manager 550 may handle overhead issues corresponding to the various services or service bundles created. Such overhead issues may include memory allocation and organization, memory optimization, cluster management, failure and recovery processing, runtime process management, garbage collection, object pooling, and cluster management. The service execution manager 550 provides a flexible and scalable, carrier-grade environment for the requested services, and may provide a standardized framework and architecture in which to design and develop the services for a subscriber or application.

The converged subscription manager 514 may be a database or other processing and storage component that contains information or profiles regarding multiple subscribers or end-users. Such profile information may include the identity of the subscriber (e.g., a name, address, email, or telephone number), the types of services requested by the subscriber, the frequency of such service requests, time of the service requests, location of the subscriber at the time of the service request, and other customer-specific information. The Telco operator may use the profile data to drive decisions regarding the demand for certain services, and may also use such data to fine-tune or adjust the services or service bundles.

The platform manager/monitor 514 is a component configured to monitor service level agreements (SLA), provide warnings to management, and generate service statistics regarding service requests and completion of such requests. Service level agreements are agreed-upon values representing the performance criteria for the various services. For example, a particular service may be required to operate at a 99.99% success rate over a 24 hour period. Failure to meet such performance criteria may be tracked. The platform manager/monitor 514 may also track the popularity or level of customer demand of the services requested by the subscribers, and may also track errors or service execution problems, and issue error reports to management.

Figure 6:
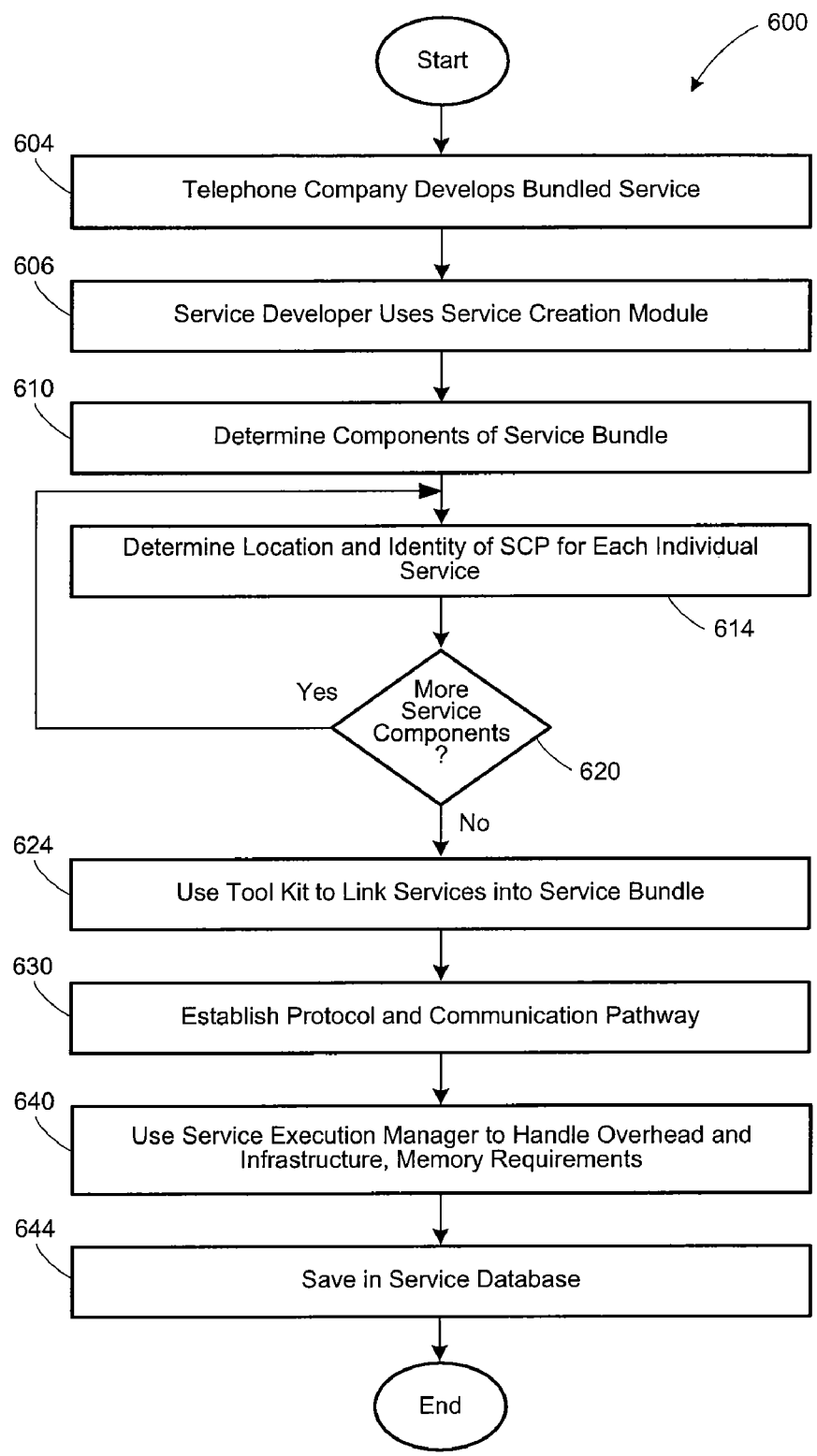
FIG. 6 is a flowchart showing a service creation process.

FIG. 6 is a flow chart showing a service request process (600) using the trigger mediation system 100. A telecommunication company may develop a bundled service or a group of bundled services (604). A software developer may use the service creation module 510 to develop the services or bundled services deemed to be important to the company (606). Using the service creation module 510, the developer determines the necessary components of the service bundle, including the individual services that comprise the service bundle (610). Next, using the service creation module 510, the identity of the individual SCPs corresponding to each individual service, and the location and communication protocol for the respective SCP/TSP is determined for each individual service (614). This process is repeated until all of the individual service components of the service bundle have been identified (620).

After all of the information for each of the service components relative to each SCP/TSP has been identified, the developer may use a tool kit or other software module to link the individual services into a service bundle (624). For each service in the service bundle, the communication protocol and communication pathway is defined (630). Next, the service execution manager 550 may establish the operating requirements, protocol, and infrastructure associated with the service bundle, including memory requirements, failure and recovery processing, run-time process management, garbage collection, and other infrastructure requirements (640). The information regarding the requirements and characteristics of the service bundle, including all SCP/TSP-related information, are saved in the service database 560 so that when a subscriber request is processed, the trigger mediation system 100 may query the service database 560 to determine how to satisfy the request (644).

Figure 7:
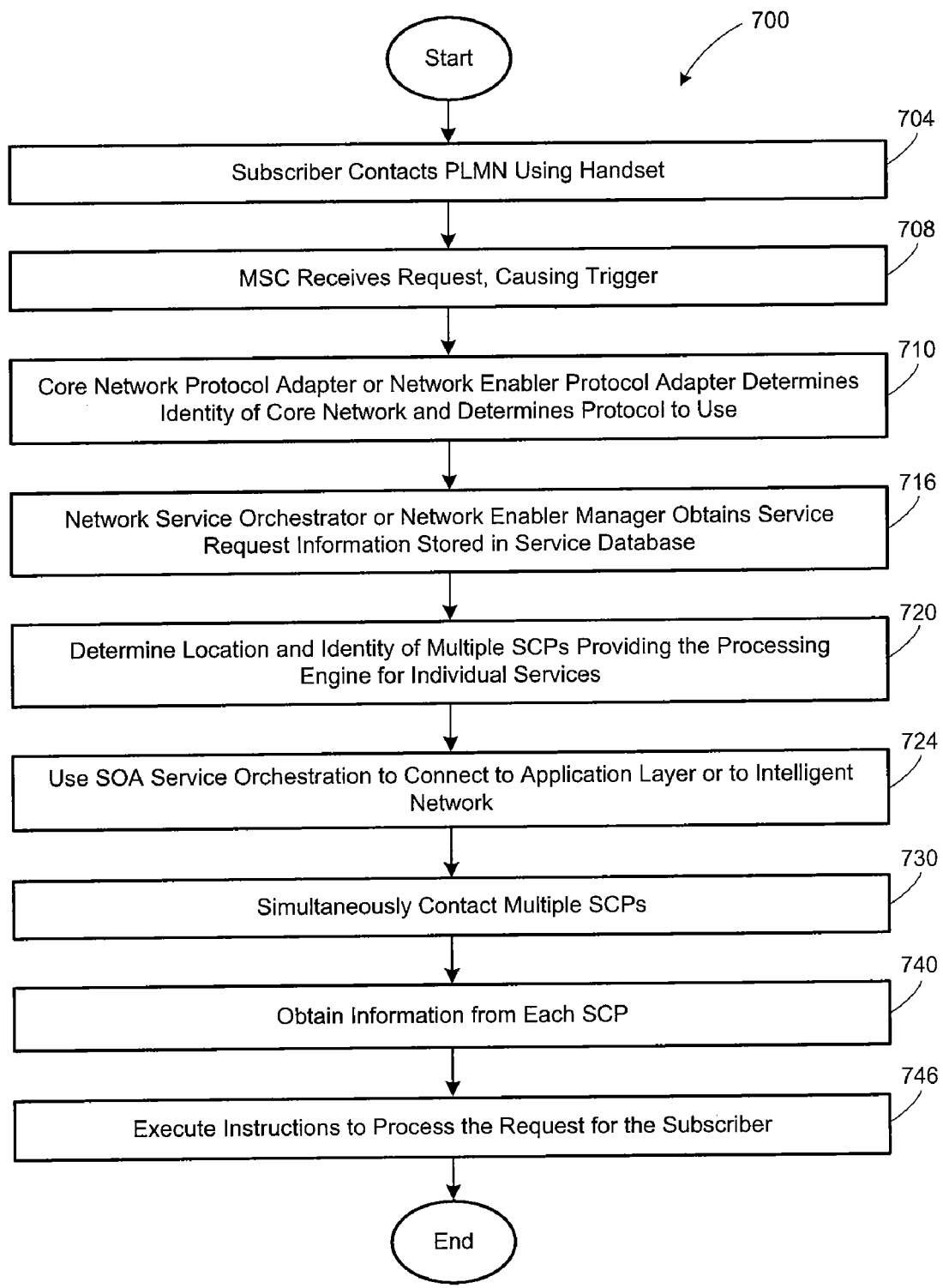
FIG. 7 is a flowchart showing a service request process.

FIG. 7 is a flow chart showing a service request process (700). Using a mobile handset or other communication device, a subscriber contacts the MSC 134. The MSC 134 receives the subscriber's request, which defines the trigger event (708). Depending on the type of request from the subscriber, either the core network protocol adapter 520 or the network enabler protocol adapter 530 determines the identity of the core network for which communication is desired and the corresponding network protocol required to service the request is determined (710). For non-messaging based subscriber requests, the network service orchestrator 526 obtains the corresponding service request information stored in the service database 560. Similarly, for message-based subscriber requests, the network enabler manager 534 obtains the service request information stored in the service database 560 (716).

The location and identity of the multiple SCPs/TSPs providing the processing engine for the individual services are then inspected (720). Using SOA service orchestrator 554, a connection is made to the application 570 or to the IN platform 156 to facilitate communication with the SCPs/TSPs (724). Multiple simultaneous requests are issued to the individual SCPs/TSPs corresponding to the separate services of the service bundle (730). Once the individual SCPs/TSPs receive the respective requests, information regarding how to handle such requests are returned to the trigger mediation system 100 through the SOA service orchestrator 554 (740). Based on the instructions returned from the respective SCPs/TSPs, the trigger mediation system 100 processes the request and handles processing the subscriber's call (746).

Figure 8:
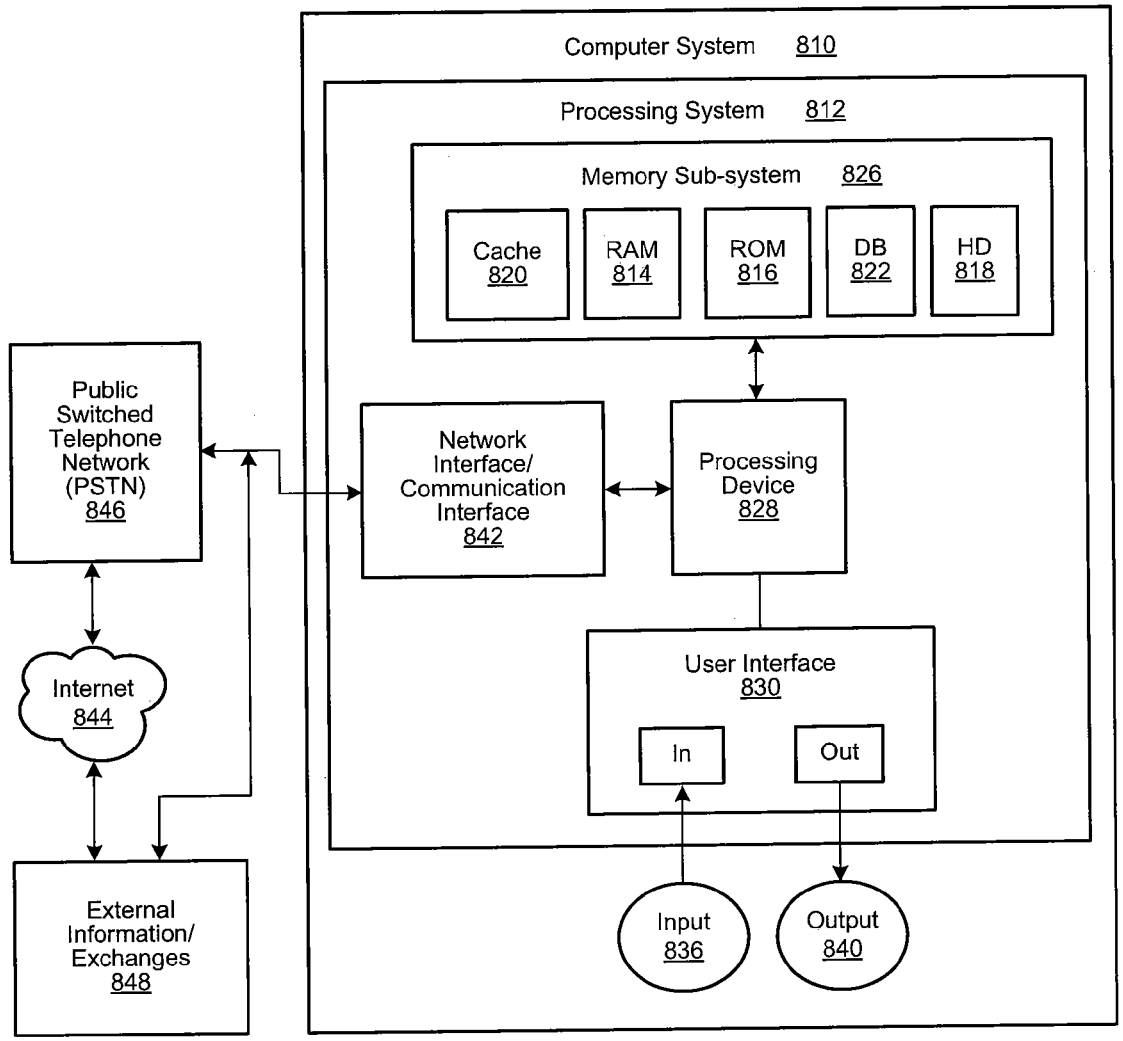
FIG. 8 is a computer system and computing environment.

The system for trigger mediation 100 may be embodied as a system cooperating with computer hardware components and/or as a computer-implemented method. Referring now to FIG. 8, a specific embodiment of a high-level hardware block diagram of a computer system on which the above-described system and method may be implemented is shown generally. A computer system 810 includes a computer or processing system 812, which includes various hardware components, such as RAM 814, ROM 816, hard disk storage 818, cache memory 820, database storage 822, and the like (also referred to as "memory subsystem" 826). The computer system 812 may include any suitable processing device 828, such as a computer, microprocessor, RISC processor (reduced instruction set computer), CISC processor (complex instruction set computer), mainframe computer, work station, single-chip computer, distributed processor, server, controller, microcontroller, discrete logic computer, and the like, as is known in the art. For example, the processing device 828 may be an Intel Pentium® microprocessor, x86 compatible microprocessor, or equivalent device.

The memory subsystem 826 may include any suitable storage components, such as RAM, EPROM (electrically programmable ROM), flash memory, dynamic memory, static memory, FIFO (first-in first-out) memory, LIFO (last-in first-out) memory, circular memory, semiconductor memory, bubble memory, buffer memory, disk memory, optical memory, cache memory, and the like. Any suitable form of memory may be used whether fixed storage on a magnetic medium, storage in a semiconductor device, or remote storage accessible through a communication link. A user interface 830 may be coupled to the processing system 812 and may include various input devices 836, such as switches selectable by the system manager and/or a keyboard. The user interface also may include suitable output devices 840, such as an LCD display, a CRT, various LED indicators, and/or a speech output device, as is known in the art.

To facilitate communication between the computer system 812 and external sources, a communication interface 842 may be operatively coupled to the computer system. The communication interface 842 may be, for example, a local area network, such as an Ethernet network, intranet, Internet, or other suitable network 844. The communication interface 842 may also be connected to a public switched telephone network (PSTN) 846 or POTS (plain old telephone system), which may facilitate communication via the Internet 844. Dedicated and remote networks may also be employed, and the system may further communicate with external exchanges and sources of information 848. Any suitable commercially-available communication device or network may be used.

The logic, circuitry, and processing described above may be encoded in a computer-readable medium such as a CDROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan) and then compiled and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors.

While various embodiments of the trigger mediation system have been described, it will be apparent to those of ordinary skill in the art that many more embodiments and implementations are possible within the scope of the invention. Accordingly, the invention is not to be restricted except in light of the attached claims and their equivalents.

We claim:

1. A system for processing a call from a subscriber in a telecommunication network, comprising:
   a service-oriented architecture-based orchestrator configured to communicate with legacy communication platforms and next-generation communication platforms and an application layer or intelligent network (IN) portion of the telecommunication network, the orchestrator configured to receive a multi-part service request corresponding to the call from the subscriber, wherein the multi-part service request includes multiple individual service requests;
   a service database configured to provide an identity and network location of a plurality of external control points, each control point representing an external network entity separate and independent from the system for processing a call, and each external control point containing processing instructions corresponding to an individual service request among the multiple service requests of the multi-part service request;
   a universal interface including a core network protocol adapter and a network enabler protocol adapter both configured to determine an identity of a core network to which the subscriber is coupled and to identify corresponding one or more network protocols required to service the multi-part service request, wherein the network protocol adapter is separate from the network enabler protocol adapter;
   wherein the core network protocol adapter is configured to:
      identify and handle non-messaging-type protocols; and
      provide a communication interface with the core network based on the identity of the core network using a protocol selected from the group consisting of an Intelligent Network Application Protocol (INAP), Camel Application Part (CAP), ISDN User Part (ISUP), Internet Systems Consortium (ISC), Mobile Application Part (MAP), and DIAMETER; and
   wherein the network enabler protocol adapter, is configured to:
      identify and handle all messaging-type protocols;
      set a messaging protocol indicator for discrete messages; and
      provide a communication interface with the core network with which the subscriber is associated using one or more messaging-type protocols selected from the group consisting of Short Message Peer-to-Peer (SMPP), Multi-Media Message-7 (MM7), Universal Communication Platform (UCP), and Mobile Location Protocol (MLP); and
   a network service orchestrator configured to simultaneously connect to each external control point and request processing instructions corresponding to the individual service request, wherein the network service orchestrator is configured to receive, from each respective control point, processing instructions corresponding to the respective individual service request, and is configured to process the multi-part service request according to the processing instructions received.

2. The system according to claim 1, wherein the multi-part request arises from a single trigger event in the telecommunication network.

3. The system according to claim 1, further including:
   a service creation module configured to facilitate the creation of a service bundle and associated enabling services corresponding to the multi-part request; and
   the service creation module in communication with the service database and configured to store in the service database linking information that links the individual service requests of the multi-part service request, wherein the information stored in the service database facilitates processing the call and servicing of the multi-part service request.

4. The system according to claim 1, wherein the network service orchestrator operatively communicates substantially simultaneously with multiple control points in a single session, using a first protocol to communicate with at least a first control point, and a second protocol to communicate with at least a second control point.

5. A system for processing a call from a subscriber in a telecommunication network, comprising:
- a service-oriented architecture-based orchestrator configured to communicate with legacy communication platforms and next-generation communication platforms and an application layer or intelligent network (IN) portion of the telecommunication network, the orchestrator configured to receive a multi-part service request corresponding to the call from the subscriber, wherein the multi-part service request includes multiple individual service requests;
- a service database configured to provide an identity and network location of a plurality of external control points, each control point representing an external network entity separate and independent from the system for processing a call, and each external control point containing processing instructions corresponding to an individual service request among the multiple service requests of the multi-part service request;
- a universal interface including a core network protocol adapter and a network enabler protocol adapter both configured to determine an identity of a core network to which the subscriber is coupled and to identify corresponding one or more network protocols required to service the multi-part service request, wherein the network protocol adapter is separate from the network enabler protocol adapter;
- wherein the core network protocol adapter is configured to;
  - identify and handle non-messaging-type protocols; and
  - provide a communication interface with the core network based on the identity of the core network using a protocol selected from the group consisting of an Intelligent Network Application Protocol (INAP), Camel Application Part (CAP), ISDN User Part (ISUP), Internet Systems Consortium (ISC), Mobile Application Part (MAP), and DIAMETER; and
- wherein the network enabler protocol adapter is configured to:
  - identify and handle all messaging-type protocols;
  - set a messaging protocol indicator for discrete messages so that corresponding subsequent communication and messages from the core network are arranged in a correct messaging protocol format; and
  - provide a communication interface with the core network with which the subscriber is associated, the communication interface selected from the group consisting of Short Message Peer-to-Peer (SMPP), Multi-Media Message-7 (MM7), Universal Communication Platform (UCP), and Mobile Location Protocol (MLP); and
- a network service orchestrator configured to simultaneously connect to each control point and request processing instructions corresponding to the individual service request, wherein the network service orchestrator is configured to receive, from each respective control point, processing instructions corresponding to the respective individual service request, and is configured to process the multi-part service request according to the processing instructions received.

6. The system according to claim 1, further comprising:
a network enabler manager coupled with the network enabler protocol adapter that is configured to process messaging-type requests and to manage execution of requested services or services bundles related to messaging.

7. The system according to claim 5, further comprising:
a network enabler manager coupled with the network enabler protocol adapter that is configured to process messaging-type requests and to manage execution of requested services or services bundles related to messaging.

* * * * *